United States Patent
Gics

(10) Patent No.: US 8,039,035 B2
(45) Date of Patent: Oct. 18, 2011

(54) BATCH RICE PRODUCTION SYSTEM AND IMPROVED MICROWAVABLE, COMMERCIALLY STERILE, SHELF-STABLE RICE PRODUCT

(76) Inventor: Paul W. Gics, Sewickley, PA (US)

( * ) Notice: Subject to any disclaimer, the term of this patent is extended or adjusted under 35 U.S.C. 154(b) by 775 days.

(21) Appl. No.: 11/448,938

(22) Filed: Jun. 7, 2006

(65) Prior Publication Data

US 2006/0292277 A1    Dec. 28, 2006

Related U.S. Application Data

(60) Provisional application No. 60/688,296, filed on Jun. 7, 2005.

(51) Int. Cl.
*A23L 1/01*    (2006.01)
(52) U.S. Cl. .................................. 426/509; 426/309
(58) Field of Classification Search .................. 426/309, 426/509
See application file for complete search history.

(56) References Cited

U.S. PATENT DOCUMENTS

| | | | | |
|---|---|---|---|---|
| 2,957,608 A | * | 10/1960 | Wahl .............................. | 222/161 |
| 5,283,033 A | * | 2/1994 | Dodrill .......................... | 422/21 |
| 5,591,475 A | * | 1/1997 | Ishida ........................... | 426/627 |
| 6,139,898 A | * | 10/2000 | Meyer et al. ................... | 426/618 |
| 6,846,532 B1 | * | 1/2005 | Bensur .......................... | 428/35.4 |

OTHER PUBLICATIONS

Juliano, Rice in Human Nutrition, Chapter 6, FAO, 1993.*
Ashman and Beckley, "How much is convenience worth", Food Processing, Jun. 1, 2004.*
Barrett, Coconut Rice, www.toomanychefs.com, Apr. 29, 2005.*
Tomato Rice, Recipezaar, Mar. 11, 2003.*

* cited by examiner

*Primary Examiner* — Jyoti Chawla
(74) *Attorney, Agent, or Firm* — Dinsmore & Shohl LLP

(57) ABSTRACT

A batch rice production system suitable for retort sterilization operations is provided. The system includes blanching a dry rice product to a desired hydration pick-up to yield a partially hydrated rice product; and topically coating the partially hydrated rice product by mixing with an oil-in-water lubricating slurry including oil, an amount of water, desired seasonings, and optional additives, wherein the amount of water includes an amount necessary to substantially achieve a desired target hydration pick-up prior to charging a retort pouch with the hydrated rice product. The system permits manipulation of two points of hydration pick-up to achieve a target hydration pick-up enabling use of gentler fill feed mechanisms and increasing versatility in the selection of rice types and flavoring additives. A superior microwaveable, shelf-stable, commercially sterile, highly palatable rice product that resembles consumer-preferred stove-top prepared rice products is also provided.

25 Claims, 1 Drawing Sheet

BATCH RICE PRODUCTION SYSTEM AND IMPROVED MICROWAVABLE, COMMERCIALLY STERILE, SHELF-STABLE RICE PRODUCT

RELATED APPLICATION

This application claims priority to U.S. Provisional Application No. 60/688,296, filed Jun. 7, 2005.

FIELD OF THE INVENTION

The present invention is directed to an improved batch rice production system which yields a microwavable, commercially sterile cooked rice product, storeable in non-refrigerated conditions for extended periods of time, and conveniently prepared by consumers. The rice product is superior in shelf stability, appearance, mouth feel and consistency when compared to microwavable rice products processed according to the current industry standard batch rice production systems.

BACKGROUND OF THE INVENTION

Today's fast-paced cultural climate, combined with the specific needs of certain populations such as, for example, field-deployed military combatants and outdoor recreational enthusiasts, has led to a surge in consumer demand for high-quality non-refrigerated shelf-stable food products that require a minimum of consumer time and effort to prepare. The essential characteristic of shelf-stable food product is that it is not susceptible to the spoilage effects of microorganisms. In order for shelf-stable food products to meet the minimum preparation needs, they should ideally be available to the consumer as pre-cooked and either instantly consumable, or consumable upon heating as through microwaving.

Due to having a moisture content too low to support microbial growth, raw and par-boiled rice are naturally very shelf-stable. Cooking of raw rice is subject to narrow acceptability parameters, and parboiled rice was developed to overcome this disadvantage. Parboiled rice is typically produced by soaking paddy rice and then heating it until gelatinization of the starch in the kernel. This causes many of the nutrients in the husk and bran of the paddy rice to diffuse into the kernel. Dry heat methods of preparation are also known. Convenient preparation of both raw and parboiled rice, however, suffer from the drawback of long cooking times, and parboiled rice, especially brown parboiled rice, takes even longer to cook making it unsuitable for short preparation demands.

The development of pre-cooked dry rice product provide consumers with a more convenient preparation time, but resulted in a reconstituted rice product having an often unacceptable texture and mouth feel.

Canned rice suffered from the disadvantages of discoloration, expensive production, and corrosion of the can by the rice product necessitating relatively high quality cans. Further, canned goods are often negatively perceived by consumers as inferior products. In addition, the canned rice product typically has to be removed from the can and placed into another container before it can be microwaved, diminishing convenience to the consumer.

The development of microwavable retort-pouches comprised of polymeric materials enabled the food industry to economically provide consumers with a commercially sterile rice product that is fully microwavable in its own packaging. Though very convenient with respect to consumer preparation, the rice product itself suffered from texture, mouthfeel and reduced shelf-stability deficiencies. It was discovered that shelf-stability could be enhanced by the addition of acid during processing, but this resulted in the need for additives to mask the acidic taste, and typically the expense of batch processing increased due to the packaging complications and additional steps related to the use of acidic and alkaline compounds.

The current industry-standard batch retort-pouch rice product processing methods result in a pouch-packaged rice product that is not fully hydrated and which only achieves full moisturization upon exposure to steam during consumer preparation, as, for example, during microwaving. Typically, the industry-standard batch processing begins by blanching the rice to partial hydration, for example, to an approximately 1 to 1.1 pick-up of moisture. An oil and flavoring mixture is prepared in a volume of water that is sufficient to fully hydrate the rice and the partially hydrated rice is added to this. However, the watery consistency and very low viscosity of this mixture necessitates the addition of starch and starch emulsifiers, such as lecithin, in order to keep the viscosity at a production-acceptable level and create a rice product that is suitably pumpable according to the standard "liquid fill" method of charging the retort pouches. The starch emulsifiers cause pitting on the surface of the rice grain, resulting in the undesirable batch processing phenomena of "fuzzy rice."

Under the currently known methods, theoretically, during the thermally sterilizing retort cycle the added heat would allow the rice to cook to complete hydration. However, in reality, as the charged pouches sit through the retort cycle the added starch complexes with some of the flavoring and settles to the bottom of the pouch resulting in an unappealing stratified product.

Across the shelf life of the product, the moisture in the pouch continues to equilibrate with the solid contents of the pouch which results in a hard, brick-like rice product after, typically, only several months. Upon heating by the consumer, a small amount of water steams and puffs the rice product, producing a barely acceptable consistency wherein the rice grains do not have individual identity and are substantially agglomerated. This conventional retort pouch rice product is clearly inferior in consistency, mouth feel and other sensory attributes when compared to consumer expectations of stove-top prepared rice.

Moreover, since the conventional batch processing methods involve the mechanical manipulation and transport of partially hydrated rice, production itself has diminished tolerances. For example, when even minor disruptions occur which stall the processing for longer than several minutes, the partially hydrated rice product is left sitting in manufacturing receptacles, piping and so on, quickly forming a hard, immovable mass that requires expensive and time-consuming production shut-downs to remove.

In addition, acceptable production tolerances permit some percentage, typically about 10% of rice product, to be "left behind" in an "emptied" vessel during certain production steps. Since the rice is only partially hydrated in conventional methods, this additional processing time for approximately 10% of the rice results in rice being charged into the retort pouches and entering the retort cycle in varying states of hydration, which results in a noticeable moisture content inconsistency in the rice when prepared by the consumer.

A further drawback to conventional retort processes which utilize the "liquid fill" method of charging the retort pouch, is the limitation this method places on the inclusion of potentially desirable "chunky" ingredients, for example, meat and other proteinaceous food stuffs.

The present invention seeks to provide a rice product that may be conveniently prepared by consumers, as, for instance, by microwaving, and that comes closer to the mouth feel, appearance and moisture content of what consumers expect from stove-top prepared rice than what is currently available. Specifically, the present invention seeks to provide a retort pouch rice product having substantially individual grain identity with improved consistency and appearance over an extended shelf life when compared to currently available retort pouch rice products. Further, the present invention seeks to provide retort pouch rice products which may optionally include a variety of other desirable chunky ingredients. In addition, the present invention seeks to provide improved batch rice production methods which overcome the aforementioned and other deficiencies in the currently employed state-of-the-art batch rice processing methods.

SUMMARY OF THE INVENTION

Accordingly, the present inventor has developed an improved novel batch rice production system which overcomes the deficiencies in the food production art, both with respect to production methods and the resulting rice product. A microwavable rice product is provided which exhibits superior mouth feel, moisture content, texture, appearance and shelf stability when compared to microwavable rice products produced according to current industry production means and standards. In particular, the presently disclosed packaged retort rice product is superior in consistency and appearance, exhibiting individual grain identity, improved flow properties, and an attractive appearance to consumers.

One embodiment of the invention provides a batch rice production system comprising the steps of:
(a) blanching a dry rice product to a desired hydration pick-up and/or desired weight to yield a partially hydrated rice product;
(b) topically coating the partially hydrated rice product by mixing the partially hydrated rice product with a slurry, the slurry comprising oil, an amount of water, seasonings and optional additives, wherein the amount of water comprises an amount necessary to substantially filly achieve a desired final pick up;
(c) charging a plurality of retort pouches with the topically coated rice product from (b), sealing the plurality of retort pouches, and layering the plurality of retort pouches in a carrier such that individual retort pouches substantially do not touch;
(d) subjecting the carrier comprising the plurality of retort pouches to a retort cycle effective to achieve commercial sterility, the retort cycle comprising the steps of:
 (i) placing the carrier into a vessel chamber of a retort vessel and closing the retort vessel to seal the carrier in the vessel chamber;
 (iii) heating the retort vessel chamber sufficiently to achieve commercial sterilization while simultaneously increasing the pressure in the vessel chamber sufficiently to prevent undesirable expansion of the retort pouches;
 (iv) cooling the vessel chamber to approximately ambient temperature while maintaining an overpressure sufficient to substantially infuse the topical coating into a rice grain; and
 (v) returning the vessel chamber to atmospheric pressure and removing the carrier comprising the plurality of retort pouches.

In other specific embodiments the rice product is mixed with at least one additional foodstuff prior to charging of the retort pouches. Examples of suitable foodstuffs include, but are not limited to, chunky ingredients such as meat or other proteinaceous food. Generally, any foodstuff which survives the temperature and pressure conditions of the inventive retort process may be suitably included.

Another embodiment further comprises placing the plurality of retort pouches on a conveyer belt and subjecting them to mechanical manipulation. In specific embodiments the mechanical manipulation is achieved by a "finger manipulation" apparatus that comprises: an apparatus having a face parallel to the conveyer belt and either spanning or having a capability of moving across a width of the belt: a plurality of retractable dowels projecting perpendicular from the face toward the conveyer belt and positioned in such a way that the plurality of dowels repeatedly descend and retract to massage the plurality of retort pouches.

The packaged rice product which emerges from this system exhibits a consistency, mouth feel and appearance substantially similar to stove-top prepared rice.

Another embodiment of the invention is directed to an improved microwavable, shelf-stable, non-refrigerated rice product comprising rice product packaged in a retort pouch wherein the rice product was processed and packaged in accordance with the improved batch rice production system of the present invention. The improved rice product is more shelf-stable and closer in appearance, consistency and mouth feel to what consumers expect from stove-top prepared rice.

These and other characteristics and advantages will become clearer by reference to the following detailed description of the preferred embodiments.

Figure 1:
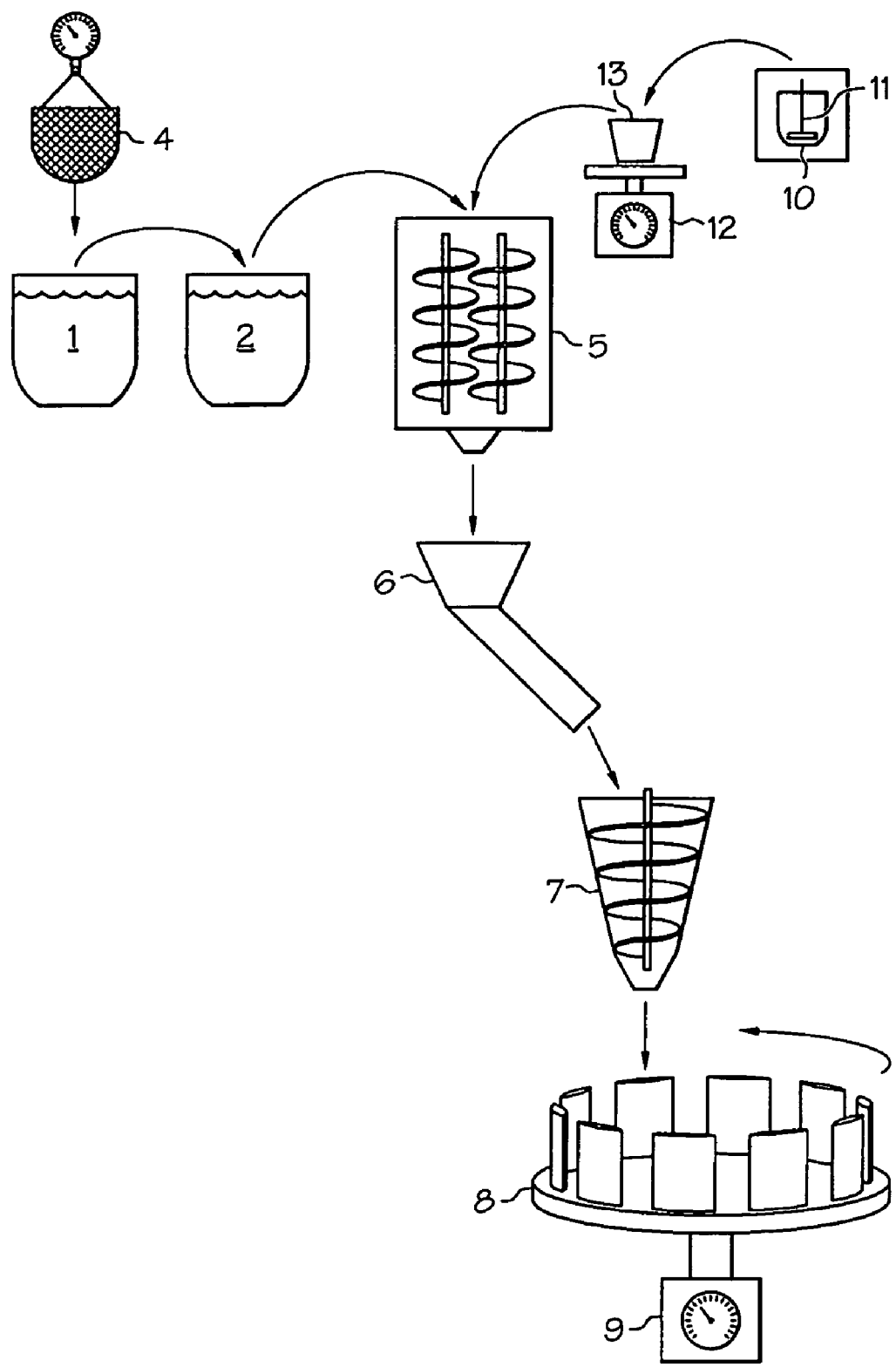
FIG. 1 is a schematic representation of a particular embodiment of the improved batch rice production system.

The embodiments set forth in the figures are illustrative in nature and not intended to be limiting of the invention defined by the claims. Moreover, individual features of the drawings and the invention will be more fully apparent and understood in view of the detailed description, below.

DETAILED DESCRIPTION

The present invention is directed to an improved batch rice production system and the superior microwavable, non-refrigerated, shelf stable processed rice product produced therefrom.

As used herein, Commercial sterility of thermally processed food means the condition achieved by application of heat, sufficient, alone or in combination with other appropriate treatments, to render the food free from microorganisms capable of growing in the food at normal non-refrigerated conditions at which the food is likely to be held during distribution and storage.

As used herein, hermetically sealed containers are containers designed and intended to be secure against the entry of microorganisms and thereby to maintain the commercial sterility of its contents after processing.

As used herein, pick up or pick-up factor is the ratio of the weight of the hydrated product to the weight of the pre-hydrated product. Essentially, it represents the amount of water "picked up" by the dry rice. For example, 200 pounds of dry rice with a "pick up" of 2.5 yields 500 pounds of hydrated rice. When cooking time is held constant, the "pick up" of different batches of rice provides an indication of the relative hydration rates. In practice, pick up is also influenced by the volume of rice in the batch and the size and shape of the blanching kettle, as well as the type of rice, so that ascertaining cooking times in order to achieve a desired pick up is typically an empirical determination. Pick up is then achieved by reference to a set cooking time.

As used herein, rice is intended to cover both white and brown varieties of all grains, short, medium and long, of rice. White rice refers to rice which has had a substantial portion of the husk, bran and germ removed. Parboiled white rice, sometimes referred to as converted rice, is white rice wherein the unhulled grain has been soaked, pressure-steamed and dried before milling, or has undergone any similar process whereby the starch in the grain is substantially gelatinized and the nutrients of the bran and germ are at least partly infused into the kernel core.

As used herein, thermal process means the heat treatment to achieve commercial sterility and is quantified in terms of time and temperature.

Reference to the accompanying figure will provide an illustration of many of the novel aspects and improved features of the inventive batch rice production system and rice product, though it should not be construed to limit the scope of the invention as defined by the claims. Referring to FIG. 1, 1 is a Blanching Kettle for boiling water, 2 is a Cooling Kettle filled with cool water, 3 is a Weight Scale, and 4 is a Blanching Screen comprising a colander with, for example, 1/16 mesh. For purposes of illustration, we will assume that a batch process begins with 200 pounds of parboiled rice. While parboiled rice is utilized in this example, the present batch system operates suitably for other rice including but not limited to non-parboiled, regular or polished white rice, brown rice, rice of short, medium and long grain designations, milled and muddy rice. In one specific embodiment the dry rice product is parboiled rice or polished white rice and in a more specific embodiment the dry rice product is parboiled rice.

A person of ordinary skill in the food processing arts will understand that different types of rice possess different rates of hydration and different ideal final moisture weight percentages. Hence, for a specific example wherein a pick-up of 2.4 is desirable such that 200 lbs of dry rice hydrates to 480 lbs of hydrated rice product, the time for acquiring this moisture pick-up will vary for different types of rice. Generally, this time is empirically pre-established for a specified volume of rice and the food processing technician or the automated calibration is set to acquire pick-up by blanching the dry rice for the this pre-established time. The achievement of the pick-up may be ascertained also by reference to the final weight of the hydrated product.

Typically, retort-sterilized rice products exhibit a blanching hydration pick-up that corresponds in part to rice variety. Conventionally, the producer must achieve the final hydration pick-up of the fill product solely by manipulating blanching parameters and adding an amount of water based product calculated to achieve sufficient hydration pick-up during the retort operation. This, however, means that the hydration pick up of the fill product is no greater than the hydration pick up of the blanched product, and the consistency of the fill product prohibits utilization of certain efficient, economical, and less destructive feed mechanisms, for example auger/screw feed mechanisms. In order to desirably employ an industry standard auger feeder, it is necessary that the fill product have a particular viscosity typically achieved by a fill product hydration pick up of approximately 2.4, with very small tolerances.

In one embodiment of the present invention, a batch rice production system is provided wherein hydration pick-up may be achieved subsequent to blanching and prior to fill, such that rice variety and seasoning slurry ingredients may be manipulated to ensure a precise final fill product hydration pick-up suitable for the filler mechanism being employed. In one embodiment the rice variety and seasoning slurry ingredients are manipulated to achieve a final fill product pick up of between about 1.5 and about 3. In a more specific embodiment the desired final fill product pick up is between about 2.3 and 2.6. In a very specific embodiment, the rice variety and seasoning slurry ingredients are manipulated to achieve a final fill product pick up of 2.4.

In a specific embodiment illustrated in FIG. 1, 200 pounds of parboiled rice is placed into 4 which is then dipped into 1 for a set amount of time. In a very specific embodiment the desired blanching pick up is 2.4 and the blanching time is approximately 13 minutes. As noted above, this time is set by pre-determining the amount of time it takes for a particular type of rice having a particular hydration rate to achieve the desired pick-up and desired weight. 4 is removed from 1 and dipped into 2 where it is agitated and then the water is drained. This acts to reduce the hydration rate to some minimal level and to wash off the surface starch. The approximately 480 pounds of hydrated rice is then placed into 5, a mixer/blender. Here the rice is topically coated with seasonings and other additives prepared as an oil-in-water slurry.

The seasoning slurry is prepared adjunctively. 10 is a small Kettle with an agitator, 11 is a high speed/high shear or Colloid Mill, 12 is a Scale and 13 is a Bucket. Water, vegetable oil, egg proteins or their functional equivalent, and dry ingredients are placed into 10. This mixture is re-circulated through 11 to form a quasi-emulsion, referred to herein as a slurry. In one specific example the partially hydrated rice product is greater than 50% hydrated. In a more specific embodiment the partially hydrated rice product is approximately 60-70% hydrated, and in an even more specific embodiment the partially hydrated rice product is about 65% hydrated. In a very specific embodiment, the final pick up goal is approximately 2.4 to achieve a desirable 65.5% moisture content after complete hydration of the rice. The amount of water used to form the seasoned slurry will be approximately the amount necessary to achieve the final 2.4 pick up factor and/or moisture content. Typically, the pick up in the blanching step is adjusted so that the goal of a total pick up to, for example, 500 pounds of hydrated rice product is achieved after addition of the slurry. In a very specific embodiment the 500 pounds of hydrated rice product comprises approximately 2% vegetable oil, 5% dry flavoring and 1% water by weight. These percentages may be varied according, for example, the type or potency of the flavoring desired.

The viscosity of the slurry may vary but must be pourable. The emulsion ratio is determined and a proper percentage is placed into 5 and topically blended over the surface of the hydrated rice. The slurry acts as a lubricant, coating the rice grains and enabling proper pumping and mixing of the rice. The product then moves into 6, a feeder. 7 is an helical volumetric screw/auger feeder which is outside-mounted. Such volumetric screw feeders are well-known in the art and, for examples, X revolutions of the screw will deliver X volume units into a receptacle, such as a pouch. A volumetric screw feeder is designed to deliver materials at volumetric feed rates. Designed for highly accurate dispensing of feed, they may comprise a rheostat that can be set for both speed and duration. 7 also comprises a level sensor which triggers feed from 6 when the hopper gets below a set point. The use of a screw feeder, rather than the current industry standard, is very desirable because there is a substantial reduction in damage to the rice. Prior to the development of the presently inventive system, the ability to use a screw feeder in the batch rice production system was thwarted by the viscosity of the watery rice mixture that enters retort according to currently employed methods. This is due to the fact that in the industry standard batch rice retort systems, most of the cooking and hydration takes place during the retort cycle such that the mixture entering retort contains a high percentage of water giving it a viscosity which prohibits use of screw/auger feeders. The ability to use the screw/auger feeder system reduces damage to the rice and increases consistency of the product. 7 charges the retort pouch.

It will be readily understood by one of ordinary skill in the art that the presently inventive batch rice production system may comprise any retort operation that achieves an acceptable level of commercial sterility in the final product. An acceptable level according to currently governing United States laws and United States Department of Agriculture regulations is achievement of a commercial sterility factor of 6 for non-acidified foods. Typically, in a retort pouch operation, the pre-formed pouch is filled and sealed and then placed into a retort chamber for heating, cooling and drying cycles. The pouch is then packaged, if desired, in its secondary carton package. Compared to canned retort packaging, retort pouches offer faster cycle time, reduced transportation costs and improved shelf appeal. Thermal sterilization may be achieved by spray, steam-air, water immersion, and steam and is considered an equivalent if it operates thermally to achieve commercial sterilization. In addition, retorts of any design, including but not limited to horizontal, vertical, rotary and other custom designs are suitable.

Retort pouches are well-known in the art. "Retort pouch," as used herein, includes any flexible retortable pouch. Typically, the pouches comprise a polypropylene or other polymeric material laminated to a barrier material comprised of, for example, foil, aluminum dioxide, or silicon dioxide. These materials provide a barrier to, inter alia, moisture and $O_2$. The outer layer functions to hold the bag together and prevent puncture and is comprised, for example, of nylon, such as biax nylon. In one specific embodiment the retort pouch is a stand-up pouch comprising a gusseted bottom and wherein at least a portion of the pouch is transparent such that consumers may view the contents of the packaged rice product.

In a specific embodiment, 8 is a rotary retort pouch filler. The pouch is open and moves via 8. As each pouch turns it is charged with X ounces of rice via 7. The pouches are hermetically sealed, but prior to sealing they are flushed with Nitrogen gas such that the atmospheric gas is removed and substantially replaced with the Nitrogen gas. This prevents oxidation of the pouch contents during storage time. Equivalents include any means which functions similarly. 9 is a weight scale.

Sealed pouches are then placed into a carrier constructed in a manner such that the individual pouches do not come in excessive contact with one another. This permits pumping of the sterilizing hot water over nearly the entire surface area of the pouch. Under current retort industry standards, thermal sterilization is deemed to occur at 240° F. A typical retort sterilization cycle comprises: placing the carrier into the vessel chamber of a retort vessel, closing the vessel, initiating the water spray, increasing the heat for approximately 10 minutes until the target temperature of 240° F. is reached, holding this temperature for approximately 25 minutes, and rapidly cooling the vessel chamber over a period of approximately 15 minutes to achieve a final temperature of about 75° F.

The retort pouches are filled and enter the retort operation at ambient temperature. Hence, the flexible retort pouches will undesirably expand as they are heated. This expansion is substantially eliminated by simultaneously increasing the pressure in the vessel chamber. In currently employed retort systems, this added pressure is reduced simultaneously with the reduction in temperature. However, one embodiment of the presently inventive batch rice production system provides that the over-pressure is maintained during the reduction in temperature of the vessel chamber. This pressurizes the pouches and the contents of the pouches such that the topical coating infuses into the rice grain. Once cooled the vessel chamber is returned to atmospheric pressure and the carrier is removed.

The excess water is dried off the pouches which are then aligned abutting one another on a conveyer belt. During movement down the belt, a "finger manipulation" apparatus positioned above the belt moves from side to side across the width of the belt. In a specific embodiment the manipulation apparatus comprises a plurality of round-tipped dowels which descend and retract substantially perpendicular from the manipulation apparatus and to the conveyer belt. In a specific embodiment the dowels are ½ inch dowels spaced approximately ½ inches apart and function as the "fingers" of the "finger manipulation" apparatus. The fingers descend and retract to massage the pouch contents. The rice product typically emerges from the retort as a firm "patty" and the fingers act to break up the clumps and fluff the product to restore the product consistency to individual grains.

Typically, when a blanched rice grain is sliced across the circumference of the grain, there is a circular inner portion that is not fully hydrated to the point of softness, and a concentric outer portion that is soft and sufficiently hydrated. After conventional batch rice production methods the microwavable packaged rice product continues to equilibrate with respect to moisture over the shelf life of the product as the inner portion draws more of the moisture. After several months a hard, brick like product results. Without being bound by theory, it is believed that by substantially hydrating the rice prior to retort rather than during retort, and over-pressurizing the rice product during the rice cycle, moisture is forced into the inner portion of the rice grain so that equilibration is achieved after a much shorter time, typically after about 48 hours, and the consistency of the commercial product is much more shelf-stable, remaining at its 48 hour consistency for up to at least a year.

A person of ordinary skill in the art will appreciate that the system as disclosed may be adapted to operate automatically and continuously.

One embodiment of the invention provides a batch rice production system comprising the steps of:
  (a) blanching a dry rice product to a desired hydration pick-up and/or desired weight to yield a partially hydrated rice product;
  (b) topically coating the partially hydrated rice product by mixing the partially hydrated rice product with a slurry, the slurry comprising oil, an amount of water, seasonings and optional additives, wherein the amount of water comprises an amount necessary to substantially fully achieve a desired final pick up;
  (c) charging a plurality of retort pouches with the topically coated rice product from (b), sealing the plurality of retort pouches, and layering the plurality of retort pouches in a carrier such that individual retort pouches substantially do not touch;
  (d) subjecting the carrier comprising the plurality of retort pouches to a retort cycle effective to achieve commercial sterility, the retort cycle comprising the steps of:

(i) placing the carrier into a vessel chamber of a retort vessel and closing the retort vessel to seal the carrier in the vessel chamber;

(iii) heating the retort vessel chamber sufficiently to achieve commercial sterilization while simultaneously increasing the pressure in the vessel chamber sufficiently to prevent undesirable expansion of the retort pouches;

(iv) cooling the vessel chamber to approximately ambient temperature while maintaining an overpressure sufficient to substantially infuse the topical coating into a rice grain; and (v) returning the vessel chamber to atmospheric pressure and removing the carrier comprising the plurality of retort pouches.

In a further specific embodiment the rice product is mixed with additional optional ingredients including, but not limited to, meat or other proteinaceous food stuffs, prior to charging the retort pouches. The inventive process permits the addition of ingredients which were heretofore considered problematic with respect to conventional retort processes which rely on "liquid fill" rather than screw or auger-based charging operations. The use of screw or auger-based feeders allows the charging of a more heterogeneous as well as a more viscous material. The present invention contemplates the optional addition of any foodstuff which survives the heat and pressure requirements of the retort process. This would be easily ascertainable by a person of ordinary skill in the retort art, as the previous limitation on ingredients was determined primarily by the limitations inherent to the "liquid fill" charging operation.

Another embodiment further comprises placing the plurality of retort pouches on a conveyer belt and subjecting them to mechanical manipulation. In specific embodiments the mechanical manipulation is achieved by a "finger manipulation" apparatus that comprises: an apparatus having a face parallel to the conveyer belt and either spanning or having a capability of moving across a width of the belt: a plurality of retractable dowels projecting perpendicular from the face toward the conveyer belt and positioned in such a way that the plurality of dowels repeatedly descend and retract to massage the plurality of retort pouches.

The packaged rice product which emerges from this system exhibits a consistency, mouth feel and appearance substantially similar to stove-top prepared rice.

Another embodiment of the invention is directed to an improved microwavable, shelf-stable, non-refrigerated rice product comprising rice product packaged in a retort pouch wherein the rice product was processed and packaged in accordance with the improved batch rice production system of the present invention. The improved rice product is more shelf-stable and closer in appearance, consistency and mouth feel to what consumers expect from stove-top prepared rice.

In summary, the inventive batch rice production system provides several advantages over the current state-of-the-art production systems. First, it substantially hydrates and moisturizes the rice during the blanching process rather than during retort. In addition, it comprises the preparation and application of a topical coating comprised of a seasoned slurry which functions to lubricate the rice grain. These two features result in a rice product having a rheological profile which permits use of gentler feeder and charger mechanisms prior to retort. In addition, the substantially hydrated rice product is less likely to harden and cause extended production shutdowns in the event of minor disruptions and stalls in the production line. In addition, the early hydration substantially eliminates the need for added starch and starch emulsifiers such as lecithin, which pit the surface of the rice grain causing the phenomena of "fuzzy rice." In conventional production systems, starch must be added to the watery rice product in order to achieve a suitable viscosity. In addition, without intending to be bound by theory, the presently inventive step of maintaining overpressure during the cooling part of the retort cycle acts to infuse the rice grain with the topical coating and force moisture into the typically drier core. This reduces the post-retort moisture equilibration time to only about 48 hours, substantially eliminating the problems with shelf life consistency instability and hardening over time experienced by rice products processed according to current batch rice production methods.

EXAMPLE 1

The following provides an illustrative example of batch production of an Asian stir fry rice according to one embodiment of the present invention. In particular, the example illustrates the desirability and superior functioning of a batch rice production system comprising two hydration pick-up points which may be manipulated in concert to achieve the goal pick up.

200 pounds of RICELAND® parboiled rice is emptied into the blanching basket and the scale is checked to verify a scale weight of 200 lbs. The charged rice basked is lowered into a rectangular blancher. The water in the blancher is rapidly boiling and maintained at 212° F. A stir paddle stirs constantly and vigorously. 200 pounds of dry rice will weigh 440 pounds after hydrating to a 2.2 pick up in the blancher. The tolerance on 2.2 water pickup for 200 pounds of rice is 440+/−5 lbs. The rice is cooled by submerging into a cooling tank located adjacent the blancher. The rice is vigorously stirred for 2 minutes in the cooling tank, or until the core of the rice is cool enough to remove the starch from the rice. Fresh water is flowing into the cooling tank continuously at a rate of 5-6 gpm. The rice should be approximately 50° F. after the cooling rinse. The cooled rice is dumped into a paddle mixer tote.

The Asian stir fry slurry for 440 pounds of cooled rice is prepared according to the following: 13.8 pounds toasted sesame oil 17 pounds clear soy sauce 23 pounds water 27.2 pounds spice blend =81.5 pounds/552.8 pound batch This results in a final pick-up of 2.4

The ingredients listed above are placed into a high shear mixer and blended slowly for 3 minutes. A total of 11.8 pounds dehydrated onions, carrots and peas are blanched yielding 29.51 pounds hydrated vegetables. The 440 pounds of blanched, partially hydrated rice product is added to a paddle mixer. With the paddle mixer running slowly, the 81.5 pounds of slurry, 29.51 pounds hydrated vegetables and 1.8 pounds sesame seeds are evenly added. The mixed product is released into a Hapman feed auger at half full per charge and 50% hopper loading is maintained. One 40 pound rework is assessed per batch. The final hydration pick up at fill is 2.4. The parameters of the slurry are selected to achieve this ideal final hydration pick-up, given the initial partial pick up of the dry rice after blanching. The novel batch rice production system, comprising two variable hydration points which may be manipulated in concert with one another to achieve the final 2.4 pick up, permits greater versatility in potential combinations of rice type and flavorings and yields a fill consistency that permits employment of auger feed mechanisms.

EXAMPLE 2

The following example provides an illustration of how the hydration pick-up points are manipulated to achieve a desirable final hydration pick-up in the fill product and a superior garlic-butter rice product.

200 pounds of RICELAND® parboiled rice is emptied into the blanching basket and the scale is checked to verify a scale weight of 200 lbs. The charged rice basked is lowered into a rectangular blancher. The water in the blancher is rapidly boiling and maintained at 212° F. A stir paddle stirs constantly and vigorously. 200 pounds of dry rice will weigh 460 pounds after hydrating to a 2.3 pick up in the blancher. The tolerance on 2.3 water pickup for 200 pounds of rice is 460+/−5 lbs. The rice is cooled by submerging into a cooling tank located adjacent the blancher. The rice is vigorously stirred for 2 minutes in the cooling tank, or until the core of the rice is cool enough to remove the starch from the rice. Fresh water is flowing into the cooling tank continuously at a rate of 5-6 gpm. The rice should be approximately 50° F. after the cooling rinse. The cooled rice is dumped into a paddle mixer tote.

The garlic-butter flavored slurry for 460 pounds of cooled rice is prepared according to the following:

10.0 pounds margarine
  20.0 pounds tap water
  5.2 pounds soy oil
  0.35 pounds butter flavor
  0.25 pounds turmeric
  0.13 pounds ajitide
  26.45 pounds garlic butter proprietary spice blend
  =62.13 pounds/522.88 pound batch The margarine, butter flavor and soy oil are mixed into a high shear mixer for 30 seconds. The water is added slowly. Spice blend, turmeric and ajitide are added to the slurry in high shear mixer. Add 460 pounds of blanched rice product to paddle mixer and slowly add 62 pounds of the flavored slurry, blend slowly for three minutes while adding dehydrated chives evenly. The mixed product is released into a Hapman feed auger at half full per charge and 50% hopper loading is maintained. One 40 pound rework is assessed per batch. The final hydration pick up at fill is 2.4.

EXAMPLE 3

The following example provides a further illustration of how the hydration pick-up points are manipulated to achieve a desirable final hydration pick-up in the fill product, and production of a superior black bean/chipotle flavored rice product.

The production is similar to that recited supra, except that 200 pounds of dry RICELAND® parboiled rice will weigh 420 pounds after hydrating to a 2.1 pick up in the blancher. The tolerance on 2.1 water pickup for 200 pounds of rice is 420+/−5 lbs.

The black bean/chipotle flavored slurry for 420 pounds of cooled rice is prepared according to the following:

12.2 pounds soy oil
  80 pounds tap water
  30.50 pounds black bean/chipotle proprietary spice blend
  =122.70 pounds The rice and slurry are added to the paddle mixer, 3.61 pounds dehydrated vegetables which have been blanched to re-hydrate to 9.38 pounds, are added to the mix, and 12.2 pounds corn and 44.0 pounds soaked beans are added as non-rehydrated ingredients. The mixed product is released into a Hapman feed auger at half full per charge and 50% hopper loading is maintained. One 40 pound rework is assessed per batch. The final hydration pick up at fill is 2.4.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

What is claimed:

1. A batch rice production system comprising:
   (a) heating a dry rice product to a desired hydration pick-up to yield a partially hydrated rice product;
   (b) cooling the partially hydrated rice product with cool water, wherein the cool water and surface starch are removed from the partially hydrated rice product;
   (c) topically coating the partially hydrated rice product by mixing the partially hydrated rice product with an oil-in-water lubricating emulsion, the emulsion comprising: oil, an amount of water, desired seasonings, and optional additives, wherein the amount of water in the emulsion comprises an amount necessary to substantially achieve a desired target hydration pick-up prior to charging a retort pouch with the hydrated rice product;
   (d) charging a plurality of retort pouches with the topically coated rice product from (c);
   (e) hermetically sealing the plurality of retort pouches and loading the retort pouches into a retort-adapted carrier; and
   (f) subjecting the plurality of retort pouches to a retort cycle effective to achieve commercial sterility, wherein the topically coated rice product has a consistency of stove-top prepared rice.

2. The batch rice production system according to claim 1, wherein the retort cycle of (f) comprises the steps of:
   (i) placing the carrier into a vessel chamber of a retort vessel and closing the retort vessel to seal the carrier in the vessel chamber;
   (ii) heating the retort vessel chamber sufficiently to achieve commercial sterilization of the rice product while simultaneously increasing pressure in the vessel chamber sufficiently to prevent undesirable expansion of the retort pouches;
   (iv) cooling the vessel chamber to approximately ambient temperature while maintaining an overpressure sufficient to substantially infuse the topical coating into a rice grain;
   (v) returning the vessel chamber to atmospheric pressure; and
   (vi) removing the carrier comprising the plurality of retort pouches.

3. The batch rice production system according to claim 2, further comprising subjecting the plurality of retort pouches to mechanical manipulation.

4. The batch rice production system according to claim 3, wherein mechanical manipulation comprises placing the plurality of retort pouches on a conveyer belt and employing a retractable finger manipulation apparatus positioned to massage the plurality of retort pouches as they move down the conveyer belt.

5. The batch rice production system according to claim 2 being fully or partially automated.

6. The batch rice production system according to claim 1, wherein step (c) further comprises mixing in at least one additional foodstuff prior to charging.

7. The batch rice production system according to claim 6, wherein the additional foodstuff comprises a chunky solid ingredient.

8. The batch rice production system according to claim 7, wherein the chunky solid ingredient comprises at least one food selected from the group consisting of meats, vegetables, beans, legumes, meat substitutes, and combinations thereof.

9. The batch rice production system according to claim 1, wherein loading the plurality of retort pouches comprises layering the retort pouches in the retort-adapted carrier such that individual retort pouches substantially do not touch one another.

10. The batch rice production system according to claim 1, wherein the dry rice product comprises one or more of white and brown rice, including one or more of short, medium or long grain varieties.

11. The batch rice production system according to claim 10, wherein the dry rice product comprises white rice.

12. The batch rice production system according to claim 11, wherein the white rice comprises parboiled white rice.

13. The batch rice production system according to claim 1, wherein the desired target hydration pick-up is between about 1.5 and about 3.

14. The batch rice production system according to claim 1, wherein the desired target hydration pick-up is between about 2.3 and about 2.6.

15. The batch rice production system according to claim 1, wherein the desired target hydration pick-up is about 2.4.

16. The batch rice production system according to claim 1, wherein the partially hydrated rice product of (a) is greater than about 50% hydrated.

17. The batch rice production system according to claim 1, wherein the partially hydrated rice product of (a) is between about 60% and about 70% hydrated.

18. The batch rice production system according to claim 1, wherein the desired target hydration pick up is about 2.4 and the partially hydrated rice product of (a) is about 65% hydrated.

19. The batch rice production system according to claim 1, wherein charging the plurality of retort pouches comprises employment of a screw or auger feeder system.

20. The batch rice production system according to claim 1, wherein a retort pouch is a stand-up pouch comprising a gusseted bottom.

21. The batch rice production system of claim 1, wherein the optional additives are selected from the group consisting of flavoring additives, coloring additives, and preservatives and combinations thereof.

22. A microwavable, shelf stable, retort-sterilized rice product comprising the rice product produced according to the batch rice production system as recited in claim 1.

23. The rice product according to claim 22, wherein the rice product comprises individual rice grains, a grain having a cross-sectional circumference and diameter and comprising concentric inner and outer portions, wherein the inner and outer portions have equal thicknesses of approximately one half the cross-sectional diameter, further wherein the inner and outer portions equilibrate with one another with respect to hydration and are substantially equilibrated within about 48 hours after returning the vessel chamber to atmospheric pressure.

24. A retort-sterilized batch rice production system comprising providing a first point and a second point of hydration pick-up of a dry rice product prior to a substantially hydrated product entering a retort sterilization operation, wherein the first point of hydration comprises washing surface starch from the product with water and the second point of hydration comprises coating the product with an oil-in-water emulsion, and wherein the first and second points of hydration are manipulated in concert with one another to yield a fill rice product that is substantially hydrated prior to retort having a target hydration pick-up suitable for charging a retort pouch via an auger volumetric feeder mechanism, wherein the target hydration pick-up is between about 2.3 and about 2.6 and wherein the rice product in the retort pouch has a consistency of stove-top prepared rice.

25. The retort-sterilized batch rice production system according to claim 24 wherein the target hydration pick up is approximately 2.4.

* * * * *